(12) United States Patent
Mitzler et al.

(10) Patent No.: US 10,995,873 B2
(45) Date of Patent: May 4, 2021

(54) VALVE AND VALVE ARRANGEMENT

(71) Applicant: Alfmeier Präzision SE, Treuchtlingen (DE)

(72) Inventors: Matthias Mitzler, Graben (DE); Erich Dörfler, Landsberg (DE); Klaus Beetz, Weissenburg (DE); Wolfgang Beyerlein, Mitteleschenbach (DE)

(73) Assignee: Alfmeier Präzision SE, Treuchtlingen (DE)

( * ) Notice: Subject to any disclaimer, the term of this patent is extended or adjusted under 35 U.S.C. 154(b) by 164 days.

(21) Appl. No.: 16/038,254

(22) Filed: Jul. 18, 2018

(65) Prior Publication Data
US 2019/0056040 A1 Feb. 21, 2019

(30) Foreign Application Priority Data
Jul. 25, 2017 (DE) .................... 10 2017 116 840.0

(51) Int. Cl.
*F16K 31/02* (2006.01)
*F16K 31/00* (2006.01)
*B60N 2/90* (2018.01)
*F16K 11/20* (2006.01)

(52) U.S. Cl.
CPC ............ *F16K 31/002* (2013.01); *B60N 2/914* (2018.02); *B60N 2/976* (2018.02); *F16K 11/20* (2013.01); *F16K 31/02* (2013.01); *F16K 31/025* (2013.01)

(58) Field of Classification Search
CPC ...... F16K 31/002; F16K 31/025; F16K 31/02; F16K 31/004; F16K 31/046; F16K 11/20; F16K 11/02; F16K 27/08; B60N 2/976; B60N 2/914
See application file for complete search history.

(56) References Cited

U.S. PATENT DOCUMENTS

| | | | | |
|---|---|---|---|---|
| 7,484,528 B2 * | 2/2009 | Beyerlein | ............. | F16K 31/002 137/596 |
| 9,958,081 B2 * | 5/2018 | Deperraz | ............. | F16K 31/002 |
| 10,337,635 B2 * | 7/2019 | Asai | ...................... | F16K 31/025 |

(Continued)

FOREIGN PATENT DOCUMENTS

CN 103782076 A 5/2014

OTHER PUBLICATIONS

CN Office Action dated Sep. 19, 2019 with English translation.

*Primary Examiner* — Craig J Price
*Assistant Examiner* — Andrew J Rost
(74) *Attorney, Agent, or Firm* — JK Intelletctual Property Law, PA

(57) ABSTRACT

A valve has a valve housing with a lid, bottom, and an intermediate housing portion between the lid and bottom. The valve housing encloses a valve chamber with at least one valve opening and at least one axially movable actuator movable between a closing position to close the valve opening and an opening position to release the valve opening, one wire- or band-shaped SMA element made of a shape memory alloy to activate the actuator in the opening direction, one return element to move the actuator in the closing direction, and one printed circuit board. The SMA element is attached to the actuator at a middle section and is electrically connected at its ends to the printed circuit board to be supplied with an electrical current. A valve arrangement includes several of such valves.

21 Claims, 11 Drawing Sheets

(56) References Cited

U.S. PATENT DOCUMENTS

| | | | |
|---|---|---|---|
| 2005/0121636 A1* | 6/2005 | Scott | F16K 31/025 251/129.06 |
| 2014/0103232 A1* | 4/2014 | Deperraz | F16K 11/10 251/11 |
| 2016/0157669 A1* | 6/2016 | Andreis | A47J 31/461 222/129.1 |
| 2019/0049033 A1* | 2/2019 | Mitzler | F16K 31/025 |

* cited by examiner

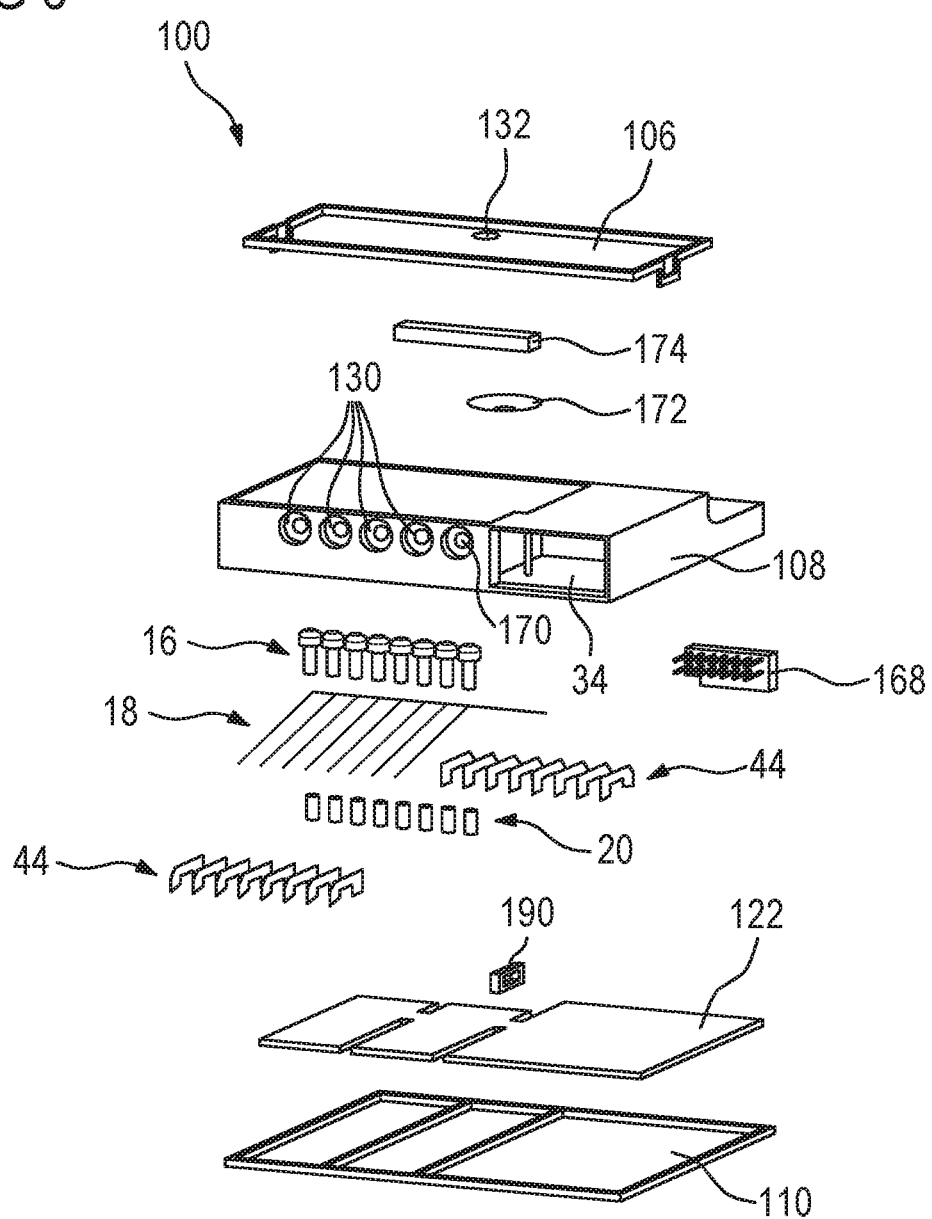

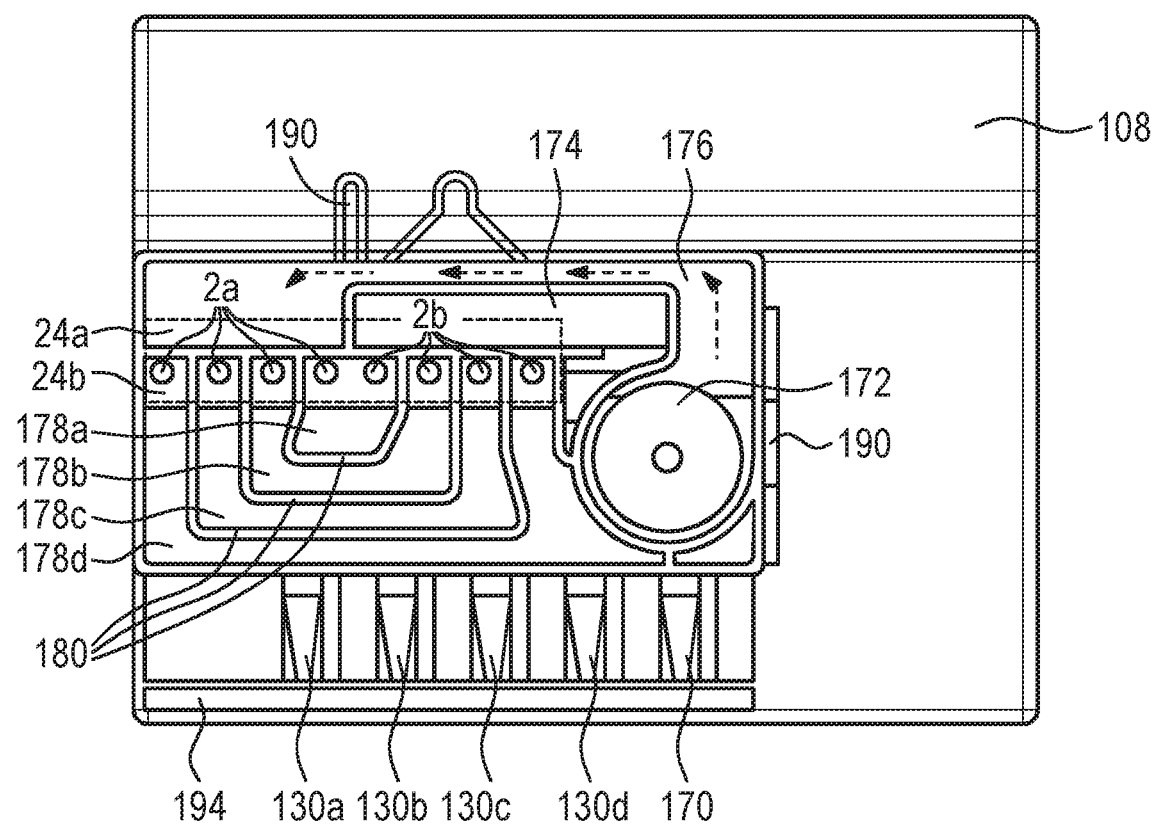

VALVE AND VALVE ARRANGEMENT

CROSS-REFERENCE TO RELATED APPLICATIONS

This application claims benefit to German Patent Application Number 10 2017 116 840.0, filed Jul. 25, 2017 which is incorporated by reference herein in its entirety.

TECHNICAL FIELD

The disclosure refers to a valve with a valve housing that encloses a valve space and has at least one valve opening. To activate such a valve, an actuator, arranged inside the valve space, can be moved between a closing position to close the valve opening and an opening position to release the valve opening. The invention also refers to a valve arrangement with several valves.

BACKGROUND

The movement of the actuator between the opening and closing position can take place with the help of shape memory alloys (SMA) that can be shaped like wires, for example. In this case, they are alloys that—depending on their temperature—can exist in two different crystalline structures. At room temperature, there is a martensitic structure with a tetragonal body-centered lattice, which starting at a transformation temperature of about 80° C., undergoes a transformation to become an austenitic structure with a cubic face-centered lattice. Therefore, a wire from such a shape memory alloy has the property to shorten when heated up via the transformation temperature owing to the transformation of the lattice from a martensitic to an austenitic structure. To heat up the SMA element, an electric current is usually applied on it, thereby shortening it so it can thus move the actuator.

It is known from DE 10 2005 060 217, for example, that a stem for opening and closing a valve opening is arranged inside the pressure chamber of a valve with a valve housing that encloses the pressure chamber. Here, the stem is activated to move the valve opening by an SMA element, which is electrically connected to a printed circuit board arranged inside the valve housing so an electric current can be applied. In addition to the SMA element and the printed circuit board, the valve encompasses numerous parts such as, for example, a shielding wall, the necessary electronic components so contact can be made to the printed circuit board, sealing elements to seal the pressure chamber or the individual parts to one another or guides to guide the actuator inside the pressure chamber. However, due to the numerous individual components necessary for the valve to function, high material costs are incurred on the one hand and the manufacturing of the individual components and their assembly are associated with a lot of effort and expense, on the other hand.

SUMMARY

It is therefore the task of the disclosed subject matter to provide a valve and a valve arrangement with fewer parts and easier assembly, wherein the actuating force of the SMA element can nonetheless be effectively used, thereby allowing the actuator to be controlled.

The task mentioned first is solved by a valve having the characteristics according to the disclosed subject matter. The valve has a valve housing that encompasses a housing lid, a housing bottom and an intermediate housing arranged between the housing lid and the housing bottom, wherein the valve housing encloses a valve chamber. The valve housing has at least one valve opening and at least one actuator arranged inside the valve chamber axially movable between a closing position to close the valve opening and an opening position to release the valve, one wire- or band-shaped SMA element made of a shape memory alloy, a return element that serves to move the actuator in opening direction or stroke direction, and a printed circuit board. So it can activate the actuator, the SMA element is attached to the actuator with a middle section and electrically connected directly or indirectly with its ends to the printed circuit board so electric current can be applied to it. At least one part of the fastening elements serving to guide the guiding elements that serve to guide the actuator and/or to attach the printed circuit board inside the valve or valve chamber and/or a receiving space to receive the components needed for making contact with the printed circuit board are formed by the intermediate housing according to the invention.

Thus, the disclosed concept consists of reducing the number of separate components needed for the functioning of the valve by integrating them into the intermediate housing itself or execute them as one piece with it. This has the advantage of not needing any additional plastic parts or subassemblies. Here, the valve chamber is understood to be the entire valve interior enclosed by the valve housing.

In a preferred design of the valve, the valve chamber includes a flow chamber and an actuation chamber, at least partially fluidically separated from one another by a valve opening having a separating wall, wherein the separating wall is executed especially as one single piece with the intermediate housing. The flow chamber is thus enclosed or bordered by the intermediate housing and on the top side by the housing lid, and the actuation chamber by the intermediate housing and by the housing bottom on the bottom side. In other words, the valve chamber is divided into two areas that are essentially separated from each other in a fluidic way, namely the flow chamber, through which a fluid, especially air, flows, and the actuation chamber or an actuator space inside of which all components necessary for activating the valve or opening the valve opening, i.e. the actuator, the SMA element and the printed circuit board, are arranged. This has the advantage that the main flow of the moving fluid flows by mainly through the flow chamber and thus not through the components necessary for activating the valve opening, especially the SMA elements, or the main flow is led to an area separate from the SMA elements. As a result of this, the temperature of the SMA elements can be adjusted and controlled more exactly, since the warming and cooling of the SMA elements takes place largely independently from the current of the fluid flowing through the valve. Moreover, owing to the uniform but reduced cooling, lower current strengths are necessary to apply an electric current to the SMA element or to activate the actuator, thus increasing the service life of the SMA element. Furthermore, as a result of this, the fluid flows uniformly, pneumatic resistance is lower and noise is optimized.

The flow chamber also has advantageously a first area and a second area, wherein a connecting channel that connects the first area of the flow chamber to the second area of the flow chamber and/or the valve opening is closed in the closing position of the actuator and released in the opening position of the actuator. In other words: A first area of the flow chamber and a second area of the flow chamber are connected to one another through the valve opening and/or the connecting channel. Here, the connecting channel is understood to be the valve area between the actuator for closing and releasing the valve opening and the seal seat surrounding the valve opening, which completely surrounds the actuator, for example. When the valve opening is closed, the connecting channel is connected to one of the two areas of the flow chambers, so that the fluid also distributes inside the connecting channel or valve area.

A pressure connection that connects the valve with an air supply unit, especially a pneumatic pump, ends in the valve chamber, especially in the flow chamber, especially preferable in the first area of the flow chamber, and/or a consumer connection that connects the valve to a media reservoir, especially an air cushion, ends in the valve chamber, especially in the flow chamber, especially preferable in the second area of the flow chamber. Preferably, the pressure connection to supply air to the valve chamber and the consumer connection to supply air to the media reservoir are formed by the intermediate housing and especially fully arranged inside the intermediate housing, so they do not protrude from the intermediate housing or valve, thereby saving space and preventing damages to the connections or supply lines or hoses connected thereto. Furthermore, at least one opening is preferably executed in the housing lid that connects the valve chamber, especially the flow chamber or the first or second area of the flow chamber to the atmosphere to let air out of the valve or the media reservoir and/or the valve chamber, especially the flow chamber, or through which the valve chamber, especially the flow chamber, can be connected to the atmosphere.

In a preferred embodiment, the guiding elements to guide a first terminal section of the actuator facing the valve opening encompass a separating wall that extends, at least partially circumferentially, around the valve opening and towards the direction of movement of the actuator, which is executed especially as one piece with the separating wall, wherein the separating wall forms a receiving space for the actuator. The separating wall is thus executed as wall section of the intermediate housing or separating wall and extends from an area surrounding the valve opening into the interior of the actuation chamber. As a result of that, when the actuator moves axially in stroke direction or opening direction and in return direction (i.e. in closing direction), it is led reliably through the intermediate housing.

To guide a second terminal section of the actuator facing away from the valve opening, additional guiding elements are integrated into the printed circuit board, especially in form of a recess executed in the printed circuit board, in particular a passage opening in which the second terminal section of the actuator extends at least partially inside and is axially mounted in a movable way, both in the opening position and in the closing position.

Serving advantageously as fastening element, there is at least one deformable projection executed on the intermediate housing that, in assembled state, extends through a passage opening of the printed circuit board and is inextricably connected to the printed circuit board. The projection is, for example, a plastic dome, which is connected to the printed circuit board in a form- and force-locking manner through staking in order to fix it in place on the intermediate housing. Fixing the printed circuit board on the intermediate housing also achieves that it is held in a free-floating way inside the valve or valve chamber, so that external influences such as a deformation of the valve housing does not affect the functionality of the valve.

For this purpose, the fastening element—especially the at least one projection—is preferably arranged on a front side of the intermediate wall facing the printed circuit board or preformed there as one piece, wherein the front side of the intermediate state forms a stopping surface of the printed circuit board during the assembly and in the assembled state in order to ensure a firm connection of the two components and therefore also a straight guiding of the actuator inside the receiving space of the intermediate wall and the seat of the printed circuit board.

Furthermore, the intermediate wall has recesses, especially longitudinal slits, preferably extending in the direction of the actuator's movement, inside which the SMA element is guided. As a result of this, its middle section is reliably held on by the actuator and a perpendicular movement of the actuator is ensured when the SMA element is supplied with electric current.

To activate the valve, electric current is supplied to the SMA element and this causes the SMA element to shorten and the valve's actuator is moved in stroke direction, thereby releasing the valve opening. To do this, both ends of the SMA elements are in each case electrically connected with the printed circuit board, preferably with a crimp connector.

In a preferred embodiment, the ends of the SMA element are here connected to the printed circuit board in such a way that the ends are in each case fixed in place perpendicularly to a movement direction of the actuator, laterally above the printed circuit board's protruding spaced-apart seat of the crimp connector and/or by an upper side of the printed circuit board in a stroke direction of the actuator. A section of the crimp connector spaced apart from the seat is arranged on the upper side of the printed circuit board and electrically connected to the printed circuit board, especially by means of at least one clamping element, which in assembled state is held in a recess of the printed circuit board in a form- and/or force-fitting way. Here, the crimp connector is—like the printed circuit board itself too—arranged in a free-floating way inside the valve chamber, to be precise inside the actuation chamber and merely fixed to the printed circuit board. The force that the SMA element exerts on the actuator is limited by the length of the SMA element or the shortening of the length of the SMA element caused by the energization. Due to the crimp connector seat protruding and extending laterally above the printed circuit board and also in the actuator's direction of movement along the printed circuit board, there is on the one hand, at least the advantage that the SMA elements are longer with the same structural height of the valve and can therefore exert a stronger force on the actuator. On the other hand, the structural height of the valve can be—compared to known valves, in which the ends of the SMA element are arranged above the printed circuit board—reduced while the length of the SMA element remains the same. The printed circuit board itself can be especially contacted or makes contact through a plug connector that can be plugged in an electrical connection in the receiving space of the intermediate housing.

The structural height of the valve can also be achieved by an advantageous design of the actuator, in which the first terminal section of the actuator has a passage opening extending perpendicularly towards the direction of movement of the actuator, which extends especially centrically through the first terminal section, wherein the middle section of the SMA element is guided within the passage opening. In this case, the SMA element is guided or threaded through the passage opening and then its ends are fixed in place in the seat of the crimp connector.

To facilitate the assembly even more, in another preferred embodiment the first terminal section of the actuator has a lateral slit that ends in the passage opening, wherein the slit especially extends from a spaced apart position from the passage opening on an external circumferential surface of the first terminal section of the actuator to the passage opening. In other words, the passage opening is accessible from the side, while the slit extends from the passage opening to the outer circumferential surface of the actuator, both perpendicularly and parallel to the actuator's direction of movement, in order to prevent a lateral slip out of the SMA element while the valve is being used. To ensure a safe closing of the valve opening, the actuator also has a sealing element on its first terminal section, which due to the advantageous design of the first terminal section described above, can be directly arranged on it.

So the media reservoir can be filled and vented with only one valve, in a valve variation an actuator element has been arranged inside the valve chamber, especially inside the flow chamber, especially preferably inside the second area of the flow chamber, which can be mounted in such a way that it can be rotated or swiveled on the intermediate housing and coupled with the actuator or interacting with it, so that the opening to the atmosphere is released when the actuator is in closed position and the opening is closed when the actuator is in releasing position. The actuator element has preferably a sealing element in a section facing the opening to the atmosphere and encompasses a return element like a leaf spring, which pre-stresses the actuator element in the opening's closing position. With such a variation, it is possible to achieve a cyclical filling and venting of the media reservoir, thus ensuring that the valve—and therefore the media reservoir—are always vented when the valve's actuator is not used.

In particular when the pressure connection and/or the consumer connection do not protrude from the intermediate housing, it is advantageous when the valve housing—especially the intermediate housing—has a support device that grasps the pressure connection and/or the consumer connection, at least partially. This protects the connections from mechanical influences and their wall strengths can be designed as thinly as possible, thereby optimizing the flow inside the connection or connection piece. Furthermore, this prevents the connection piece to be bent or broken off when the hose or line is laterally stressed by laterally pulling down the hose, for example.

Moreover, the pressure connection and/or consumer connection are preferably executed in such a way that they have a first terminal section facing away from the valve chamber and tapering off toward a free end, and a second terminal section facing the valve chamber, wherein the second terminal section is at least in part radially narrowed in circumferential direction. In other words, a free end of the pressure connection and/or consumer connection or of the connecting piece has a smaller external diameter than an end facing the valve chamber, thereby facilitating the insertion of the hose. The partially radial narrowing of the second terminal section forms a rear grip surface, wherein a hose inserted on the connection piece can be fixed in place or secured against removal.

The task mentioned in the second place is solved by a valve arrangement having the characteristics of claim 16. The valve arrangement encompasses several valves, designed in each case especially according to the preceding manner. The valve housing that encloses the valve chamber of a valve in each case, in particular the intermediate housing and/or the housing bottom, and/or the printed circuit boards, are executed as one piece. In other words, the valve chambers of all valves of the valve arrangement are enclosed by a common valve housing or a common intermediate housing and/or housing lid and/or housing bottom. Furthermore, all SMA elements of the several valves with a common printed circuit board are electrically connected. As a result of this, the number of needed parts can be significantly reduced. Such a valve arrangement is, for example, integrated into a vehicle seat with contour adjustment.

In an advantageous valve arrangement design, at least one part of the several valves has a common pressure connection that ends in each case in the valve chamber, especially in the flow chamber, especially preferably in a first area of the flow chambers or in one area of the first valve that includes the first areas of the flow chambers or is in each case connected to the valve chamber, especially the flow chamber, especially preferably the first area of the flow chamber or the area above the at least one air channel and/or at least a second part of the several valves has a common opening for connection to the atmosphere that ends especially in the first area of the flow chambers or in an area enclosing the first areas of the flow chambers or is connected via at least one air channel to the first areas of the flow chambers. In other words, the valve chambers of one part of the valves are fluidically connected to the common pressure connection, especially via air channels and/or areas or chambers or chambers integrated into the intermediate housing or formed by it, to supply air to the respective valve chambers or flow chambers, more precisely to the first area of the flow chambers of the first valve. In addition, the valve chambers of one part of the valves are connected to the atmosphere through a common opening, especially in particular once again by air channels and/or areas or chambers integrated into the intermediate housing or formed by it to release air from the corresponding valve chambers or flow chambers, more precisely into the second areas of the flow chambers of the second valve. In a vehicle seat with contour adjustment, such a valve arrangement serves to adjust the lower spine or provide lateral support, wherein in a media reservoir shaped like an air cushion, there are in each case two allocated valves that are connected to it via the consumer connection and a supply line or hose, wherein the first valve is connected to a pneumatic pump via the pressure connection and a supply line, and the second valve is connected to the atmosphere via the opening. By opening the first valve when the second valve is simultaneously closed, the media reservoir is filled, and when both valves are closed, the air volume inside the air cushion is trapped in a gas tight way and maintained like that. The air cushion is emptied by opening the second valve when the first valve is simultaneously closed. From the consumer side, the valves allocated to a media reservoir are fluidically connected via a common air channel or a common air chamber. Thus, the first and second valves form a 3/3-way valve as a valve structural group.

In an alternative advantageous embodiment, the several valves have a common pressure connection that ends in each case in the valve chamber, especially in the flow chamber, especially preferably in the first area of the flow chamber of the valves or in an area enclosing the first areas of the flow chambers or is in each case connected to the valve chamber, especially to the flow chamber, especially preferably to the first area of the flow chambers or the area above at least one air channel, wherein each valve has a separate opening to connect the valve chamber, especially the flow chamber, to the atmosphere, which ends especially in the second area of the flow chamber. In other words, the valve chambers of all valves are fluidically connected to the common pressure connection, especially via air channels and/or areas or chambers integrated into the intermediate housing or formed by it to supply air to the respective valve chambers or flow chambers, more precisely to the first area of the flow chambers. In addition, the valve chambers of all valves are or can be connected in each case to the atmosphere through an opening, especially once again by air channels and/or chambers or areas integrated into the intermediate housing or formed by it for letting out air out of the media reservoirs or the respective valve chambers or flow chambers, more precisely from the second areas of the flow chambers, thereby achieving a 3/2-way functionality to carry out a massaging function, for example, wherein the valve opening and the opening to the atmosphere are alternately released and closed in order to achieve a cyclical adjustment of the vehicle seat contour.

The valve's functionality, whether 3/3-way or 3/2-way functionality, is thus primarily determined here by the design of the intermediate housing, which forms the valve chambers and air channels or chambers. Thus, by selecting or replacing the intermediate housing accordingly, either a cyclical massaging function or a static adjustment function can be achieved.

For developing 3/3-way functionality, in a preferred design the valve chambers of the several valves are, on the one hand, separated from the receiving space for the electronic contacting of the printed circuit board by a separating wall executed especially as one piece with the intermediate housing. On the other hand, the valves—whose valve chambers, especially their flow chambers, especially preferably their first areas—are connected to the pressure connection, and the valves—whose valve chambers, especially their flow chambers, especially preferable their first areas—are connected to the atmosphere, separated from one another by a separating wall, wherein the separating wall is executed especially as one piece with the intermediate housing. For developing 3/2-way functionality, in a preferred design, the valve chambers of the several valves are at least separated from the receiving space for the electronic contacting of the printed circuit board by a separating wall executed especially as one piece with the intermediate housing. The several valves can be activated independently from one another in order to selectively fill or empty individual air cushions.

Here, the separating walls have, especially in the assembled state, a pneumatically sealed passage opening for the printed circuit board.

BRIEF DESCRIPTION OF THE DRAWINGS

The disclosed subject matter will be explained in more detail below, also with regard to additional characteristics and advantages, by describing embodiments and making references to the enclosed drawings, which show in each case in a schematic sketch:

FIG. 6 is an exploded isometric view of a valve arrangement with several valves with an intermediate housing according to a first embodiment.

FIG. 7 is a top view of the intermediate housing of a valve arrangement according to FIG. 6.

DETAILED DESCRIPTION

Figure 1A:
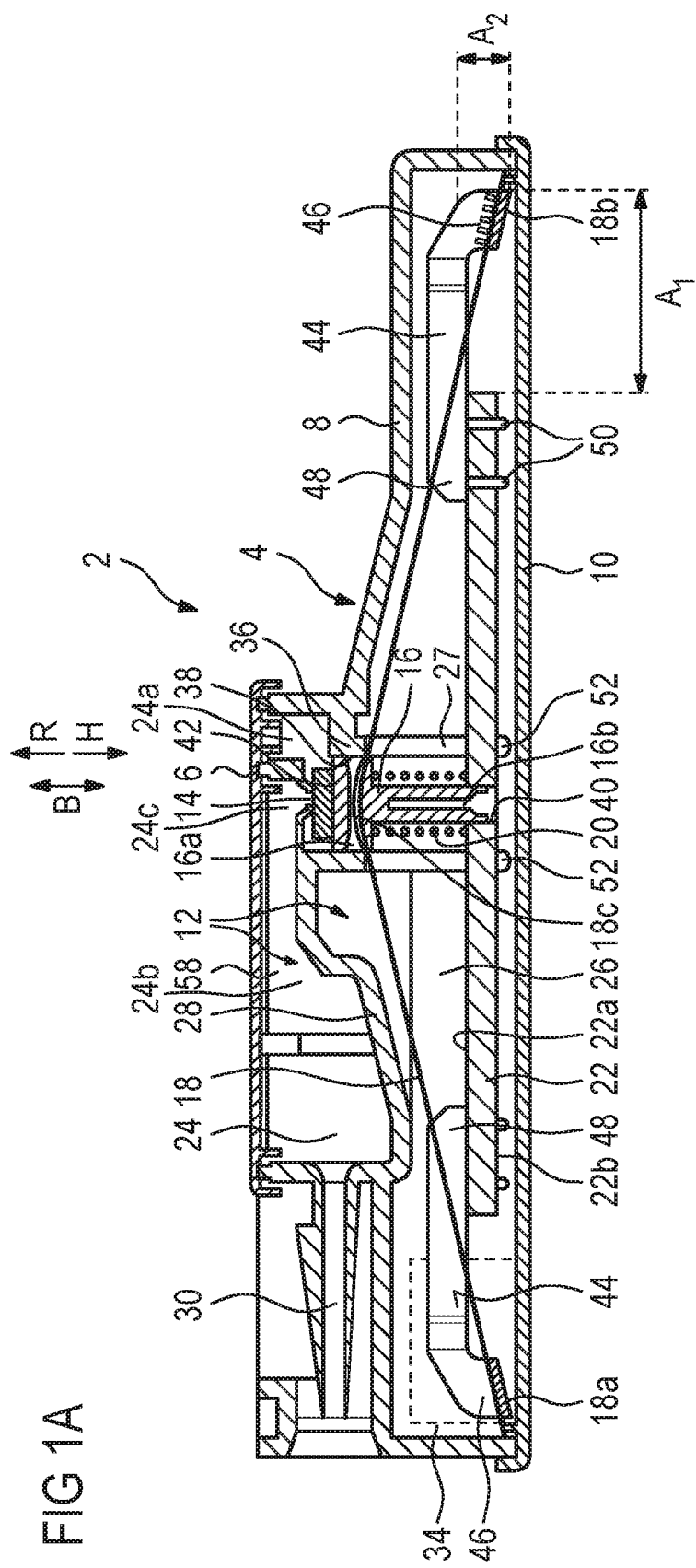
FIG. 1A is a sectional view of a valve according to a first embodiment in a closed position.

FIG. 1A shows a valve 2 with a valve housing 4, which consists of one upper housing lid 6, a lower housing bottom 10 and an intermediate housing 8 arranged between the housing lid 6 and the housing bottom 10. The valve 4 encloses a valve chamber 12, in which a valve opening 14 ends. Inside the valve chamber 12, an axially movable actuator 16 has been arranged between a closing position for closing the valve opening 14 and an opening position for releasing the valve opening 14 in a direction of movement B. A wire-shaped SMA element 18 from a shape memory alloy, held onto the actuator 16, more precisely onto its first terminal section 16a, with a middle section 18c, serves to activate the actuator 16 in an opening direction or stroke direction H. To supply an electric current, the SMA element 18 is electrically connected with its ends 18a, 18b to a printed circuit board 22 likewise arranged inside the valve chamber 12.

A return element 20, here a compression spring that concentrically surrounds a second terminal section 16b of the actuator 16, that supports itself with a first end on the printed circuit board 22 and with a second end on the first terminal section 16a of the actuator 16, which is radially widened compared to the second terminal section 16b, serves to move the actuator 16 in closing direction or return direction R.

The intermediate housing 8 encompasses all components necessary for the functionality of the valve 2; in other words, all parts necessary for this are integrated into the intermediate housing 8 itself, as will be explained below.

The valve chamber 12 is subdivided into a flow chamber 24 and an actuation chamber 26, separated from one another by a separating wall 28. The actuator 16 and the components necessary for activating the actuator 16, namely the SMA element 18, the return element 20 and the printed circuit board 22, are arranged inside the actuation chamber 26. The separating wall 28 is executed as one piece with the intermediate housing 8 or pre-formed on it. The flow chamber 24 has a first area 24a and a second area 24b connected to one another via a connecting channel 24c, which is closed in a closing position of the actuator 16 and released in an opening position of the actuator 16.

To supply air to the valve chamber 12, more precisely to the flow chamber 24, their first area 24a is connected to an air supply unit or to a pneumatic pump or to a pressure connection (not visible in FIG. 1A), which is or will be connected to the pneumatic pump via a supply line, ends directly or indirectly in the first area 24a of the flow chamber 24. By releasing the valve opening 14, the supplied air can flow from the first area 24a to the second area 24b via the connecting channel 24c pushing through the valve opening. The valve 2 serves especially to fill a media reservoir (not shown), for example an air cushion of a vehicle seat with adjustable contour. To achieve this, the valve chamber 12, more precisely the flow chamber 24 or its second area 24b, is fluidically connected to a consumer connection 30 or the consumer connection 30 ends in the second area 24b, so that the media reservoir can be connected to the valve 2 by means of hoses. Both the pressure connection and the consumer connection 30 are executed as one piece with the intermediate housing 8 and do not protrude from it. As far as the valve 2 serves to release the air from a media reservoir, the first area 24a of the flow chamber 24 is or can be connected to the atmosphere; when the valve opening 14 is open, the air can flow out of the media reservoir or out of the second area 24b and flow through the connecting channel 24c to the first area 24a, and from there released to the surroundings.

Furthermore, to receive the components necessary for the electric contacting of the printed circuit board 22, such as plug connectors, for example, the intermediate housing 8 has a receiving space 34 which in FIG. 1A is arranged in a back part of the intermediate housing 8 and shown merely dashed.

To guide the actuator 16 while it is being activated, guiding elements formed by the intermediate housing 8 are provided on the one hand. The guiding elements encompass an intermediate wall 36, which starting from the separating wall 28 in an area of the valve opening 14 extends in the direction of movement B into the interior of the actuation chamber 26 and is executed as one piece with the separating wall 28 or the intermediate housing 8. The intermediate wall 36 borders a receiving space 38 for the upper first terminal section 16a facing the valve opening 14. To guide the second terminal section 16b, guiding elements have been integrated into the printed circuit board 22, specifically in form of a recess 40 executed therein, in this case a passage opening into which the second terminal section 16b extends, both in the opening and closing position of the actuator 16. To guide the SMA element 18, the intermediate wall 36 has recesses 27 extending in the direction of movement B.

Thus, to guide the actuator 16 also during an axial movement in the direction of movement B (i.e. while the actuator 16 is being activated), no additional or separate guiding elements in form of further components are necessary.

To close the valve opening 14 reliably in closed position (as shown in FIG. 1A), a closing sealing element 42 that acts together with a sealing seat surrounding the valve opening 14, is arranged on the terminal section 16a facing the valve opening 14.

Figure 2:
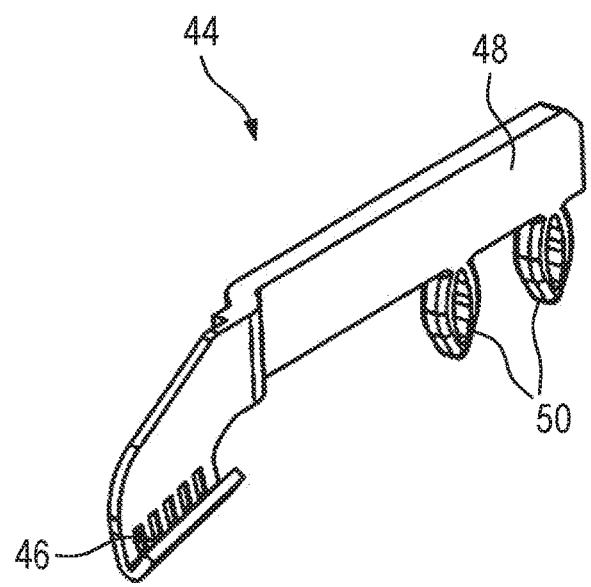
FIG. 2 is an isometric view of a crimp connector to connect the SMA element to the printed circuit board.

To control the valve 2 and supply the SMA element 18 with electric current and cause it to shorten, thereby activating the actuator 16, the ends 18a, 18b are electrically connected to the printed circuit board 22, specifically in each case by means of a crimp connector 44. Such a crimp connector 44 is shown enlarged in FIG. 2. The ends 18a, 18b of the SMA element 18 are in each case attached to a seat 46 of the crimp connector 44 and thus make indirect contact with the printed circuit board 22 via the crimp connector 44. The crimp connectors 44 protrude perpendicularly to the direction of movement B, in each case laterally with a projection $A_1$ above the printed circuit board 22. Furthermore, the crimp connectors 44 extend in stroke direction H from an upper side 22a of the printed circuit board 22 and parallel to it in the direction of the housing bottom 10, i.e. with a projection $A_2$ starting from the upper side 22a of the printed circuit board 22 towards their underside 22b, wherein the seat 46 of the crimp connector 44 ends at a distance from the housing bottom 10 (i.e. is arranged in a free-floating way inside the valve chamber 12). A section 48 of the crimp connector 44 spaced away from the seat 46 is electrically connected to the printed circuit board 22 via clamping elements 50. In doing so, the section 48 can lie flatly both on the upper side 22a and also be slightly spaced away, at least partially, from the upper side 22a. In order to have a connection independent from the tolerances of the printed circuit board 22 or its upper side 22a, the crimp connector 44 or its section 48 can be fully minimally spaced away from the upper side 22a, and the crimp connector 44 is merely supported by the clamping elements 50. Here, each crimp connector 44 has in this case two clamping elements 50 executed essentially as ring-shaped ovals and extending in each case through a recess of the printed circuit board 22 that can be elastically deformed for insertion in the recess and are held there in assembled state in a form- and/or force-fitting way. The crimp connectors 44 thus establish the electrical connection between the ends 18a, 18b of the SMA element 18 and the printed circuit board 22 fixed in place thereon. Thanks to the crimp connectors 44 protruding both laterally and in stroke direction H, it is possible to use an additional length of the SMA element 18, namely the length of the diagonal of an imagined rectangle with the side lengths $A_1$ and $A_2$, to activate the actuator 16 and achieve an overall reduction of the structural height of the valve 2. The printed circuit board 22 itself is contacted with an electrical connection through a plug connector that can be plugged in the receiving space 34 of the intermediate housing 8.

To fasten the printed circuit board 22 inside the valve chamber 12, the intermediate wall 36 integrally executed with the intermediate housing 8 has two deformable projections 52 as fastening elements pre-formed on its front side and extending in assembled state through a passage opening of the printed circuit board 22 and inextricably attached to the printed circuit board 22. At the same time, the front side forms a stopping surface for the printed circuit board 22.

Figure 1B:
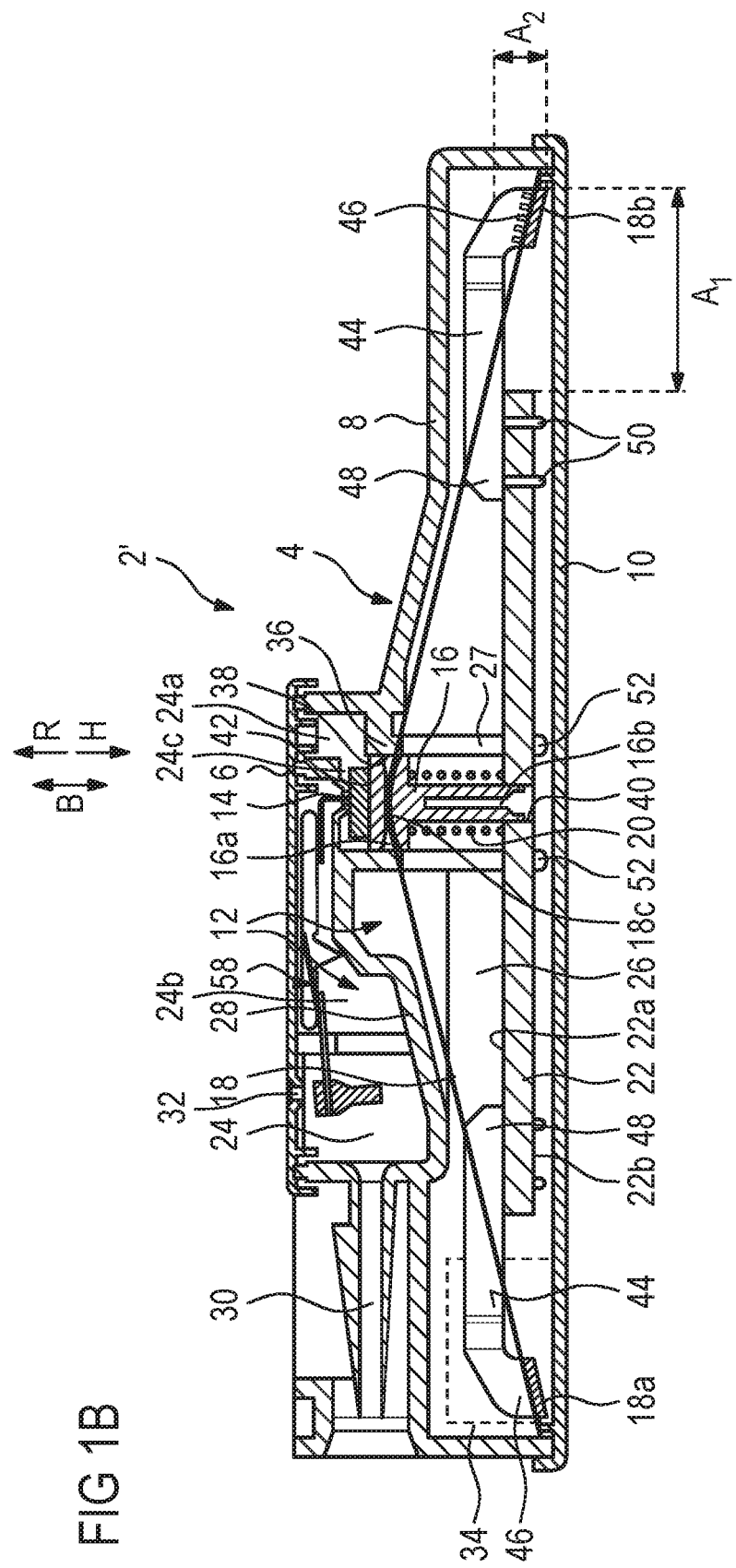
FIG. 1B is a sectional view of a valve according to a second embodiment in a closed position.
Figure 5A:
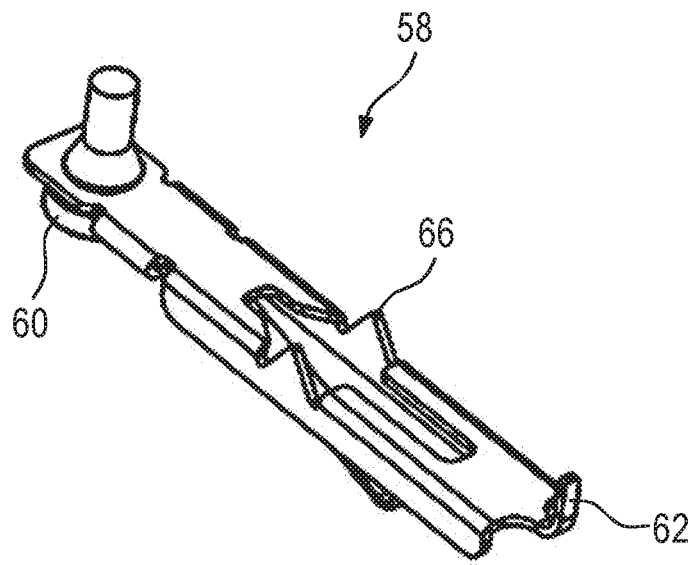
FIGS. 5A-B are respectively top and bottom isometric views of an actuator for closing and releasing the atmosphere opening.
Figure 5B:
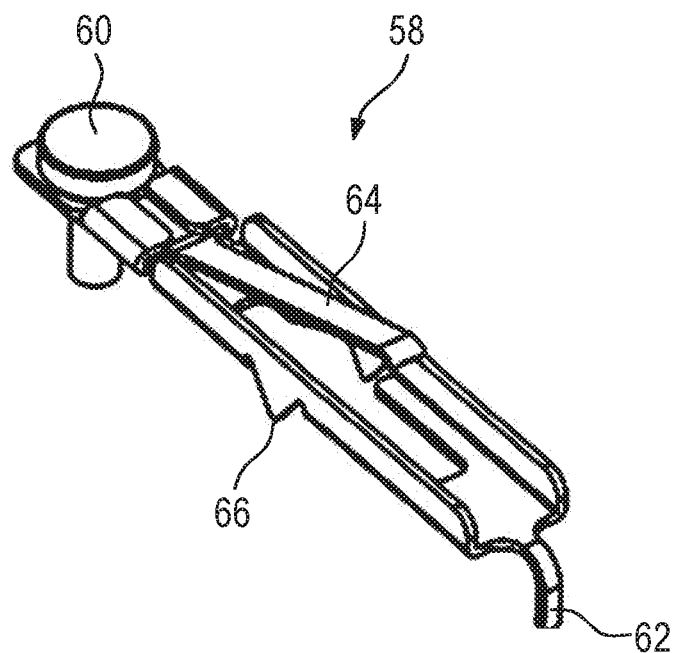

The valve 2' shown in FIG. 1B is exemplarily executed as 3/2-way valve and thus has another valve opening, specifically an opening 32, which connects the valve chamber 12 with the atmosphere to allow air to flow out from the valve chamber 12. Otherwise, the design of the valve 2' corresponds to that of the valve 2 shown in FIG. 1A ("2/2-way valve"), so that the individual components have the same reference characters. In order to achieve 3/2-way functionality, an actuator 58 has been arranged inside the valve chamber 12 or inside the flow chamber 24, pivoted on the intermediate housing 8 and operatively connected with the actuator 16. The actuator 58 is shown in more detail in FIGS. 5A, 5B. In one section facing the opening 32, the actuator 58 has a sealing element 60 for closing the opening 32. On a terminal section facing the actuator 16, the actuator 58 has a shift finger 62, which is in contact with the actuator 16 or closely fits its sealing element 42. If the actuator 16 is activated and the valve opening 14 is opened, the shift finger 62 is likewise moved in stroke direction owing to a return element 64, here a leaf spring and the actuator 58 is thus rotated around its pivot point, so that the opening 32 is closed by the sealing element 60. If electric current is no longer supplied to the SMA element 18 and since the actuator 16 is moved in return direction R due to the return element 20, the shift finger 62 is likewise moved in return direction R by the actuator 16 or its sealing element 42. As a result of this, and due to a V-shaped pivot point 66 of the actuator 58, the sealing element 60 opens the opening 32. Thus, the opening 32 to the atmosphere is released with the actuator 16 in closed position and closed with the actuator 16 in release position, to ensure that the valve chamber 12 or a media reservoir is always vented when the valve is not activated. Such a 3/2-way valve is used, for example, in a vehicle seat with massaging function, wherein one or several air cushions are in each case cyclically filled and vented.

FIGS. 3A, 3B, 3C and 3D show an enlarged view of the actuator 16 of valves 2, 2' according to the first embodiment. The first terminal section 16a of the actuator 16 has at least a passage opening 54 that extends perpendicularly to the direction of movement B of the actuator 16, which extends centrically—with regard to the direction perpendicular to the direction of movement B—through the first terminal section 16a. In the assembled state (see FIGS. 1A & 1B), the middle section 18c of the SMA element 18 is guided inside the passage opening 54. According to the "needle and thread principle", the SMA element 18 can be guided here through this passage opening 54 and reliably held there.

Figure 4A:
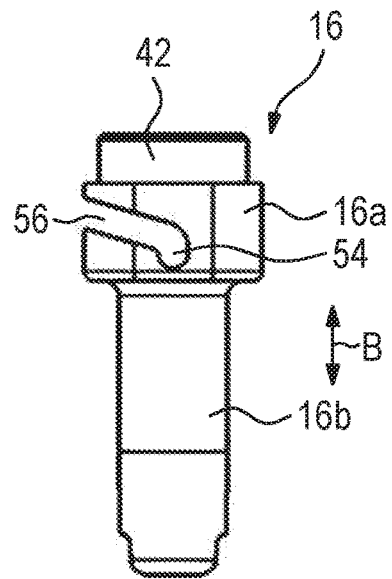
FIGS. 4A-C are respectively side, front, and isometric views of an actuator for closing and releasing the valve opening according to a second embodiment.
Figure 4B:
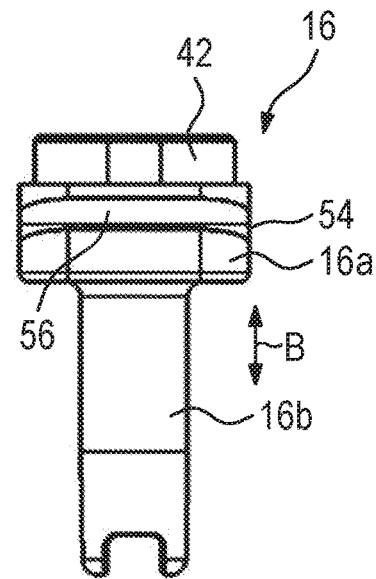
Figure 4C:
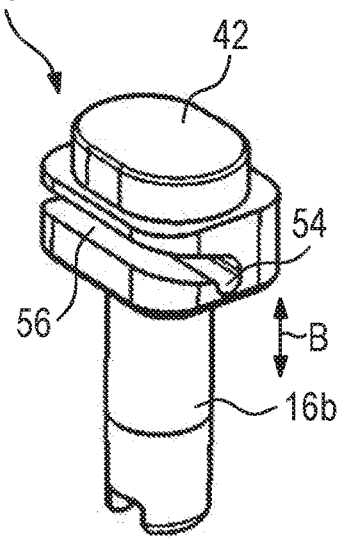
Figure 3A:
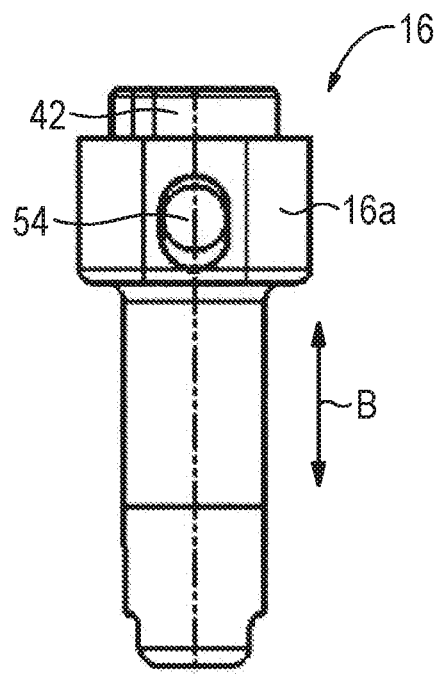
FIGS. 3A-D are respectively side, front, sectional, and isometric views of an actuator for closing and releasing the valve opening according to a first embodiment.
Figure 3B:
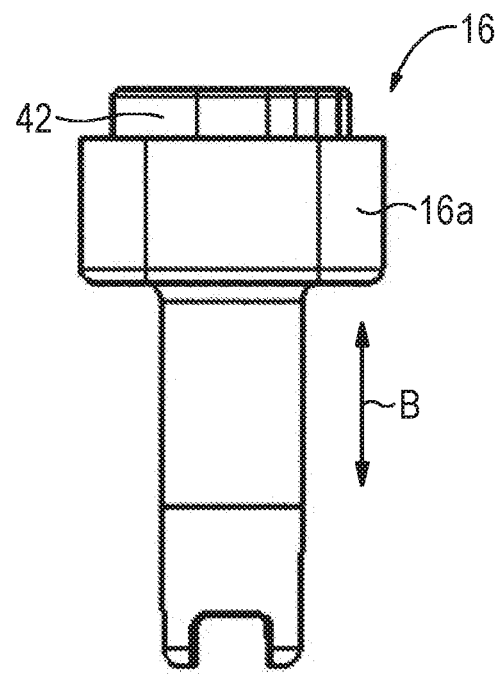
Figure 3C:
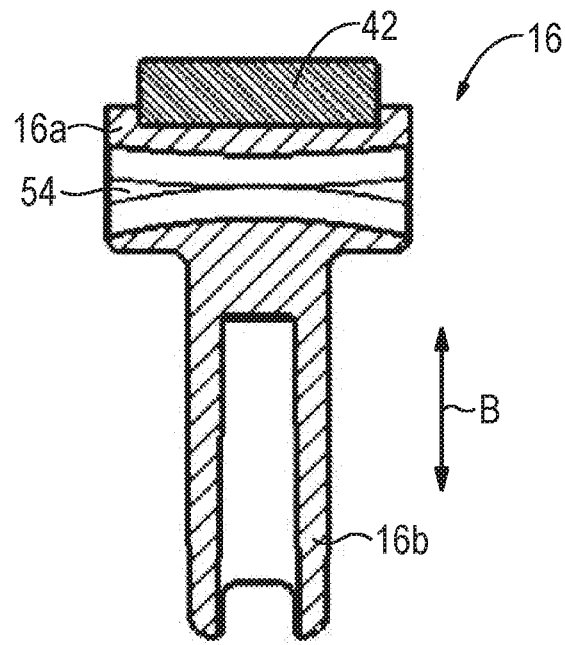
Figure 3D:
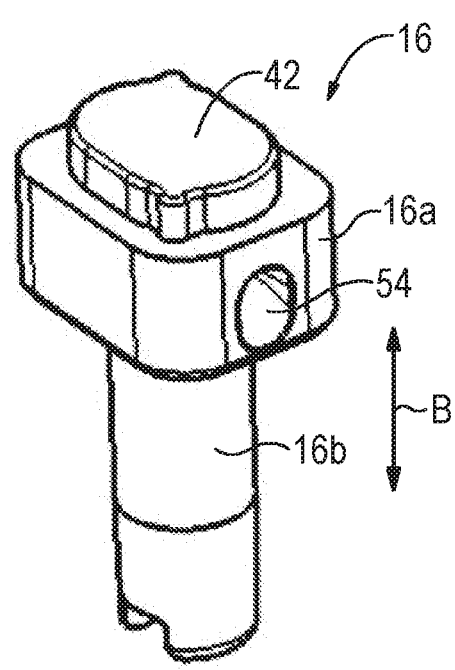

FIGS. 4A, 4B and 4C show an alternative variation for the actuator 16 of the valves 2, 2'; once again, the corresponding components are once again provided with the same reference characters. In this case, the passage opening 54 is additionally accessible via a lateral slit 56 or, additionally, a lateral slit 56 is incorporated into the first terminal section 16a, which ends in the passage opening 54. Starting from a position spaced away from the passage opening 54 in the direction of movement B of the actuator 16, the slit 56 extends along an outer circumferential surface of the first terminal section 16a towards the passage opening 54 (i.e. transversally from top to bottom) to prevent the SMA element 18 in assembled state to slip out and to ensure that it is securely held.

FIG. 6 shows an exploded view of a valve arrangement 100 with several valves 2. Here, the valve arrangement 100 includes a common valve housing for all valves 2. In other words, the valve housing enclosing in each case the valve chamber 12 of a valve 2, specifically both the intermediate housing 108, the housing lid 106 and the housing bottom 110, are executed as one piece; thus, the valve arrangement 100 has a common intermediate housing 108, a common housing lid 106 and a common housing bottom 110, inside of which the respective valve chamber 12 of a valve is executed. Furthermore, the valve arrangement 100 has a common printed circuit board 122 executed as one piece common for all valves 2. This allows the significant reduction of the need for space that the several valves 2 of the valve arrangement 100 need and the number of needed parts and assembly of the valve arrangement 100 compared to currently known valve arrangements.

The valves 2 of the exemplary valve arrangement 100 are essentially executed as the valve 2 described with the help of FIG. 1A, the corresponding components are provided with the same reference characters. In each case, they have, inside the valve chamber 12 between a closed position for closing a valve opening and an opening position to release the valve opening, an axially movable actuator 16, a wire-shaped SMA element 18 that serves to activate the actuator 16 in opening direction and a return element 20 that serves to move the actuator 16 to the closed position. The SMA elements 18 are, in turn, electrically connected to the printed circuit board with their respective ends by means of a crimp connector 44. With a middle section, the SMA elements 18 are in each case fixed to the appropriate actuator 16 to activate it in a stroke direction when electrical current is supplied to it. To do this, the printed circuit board 122 is controlled or electrically contacted via an electric plug connector 168 that can be plugged in a receiving space 34 of the intermediate housing 108. Furthermore, there is a non-return valve 172 exemplarily arranged between the intermediate housing 108 and the housing lid 106, for example in combination with a pressure sensor. Inside the valve housing there is additionally a cushioning foam 174 to reduce the generation of noise, especially when the valves 2 are vented. The intermediate housing 108 has a pressure connection 170 for connection to an air supply unit and four consumer connections 130 for connection to four media reservoirs, especially air cushions of a vehicle seat with contour adjustment.

Figure 8:
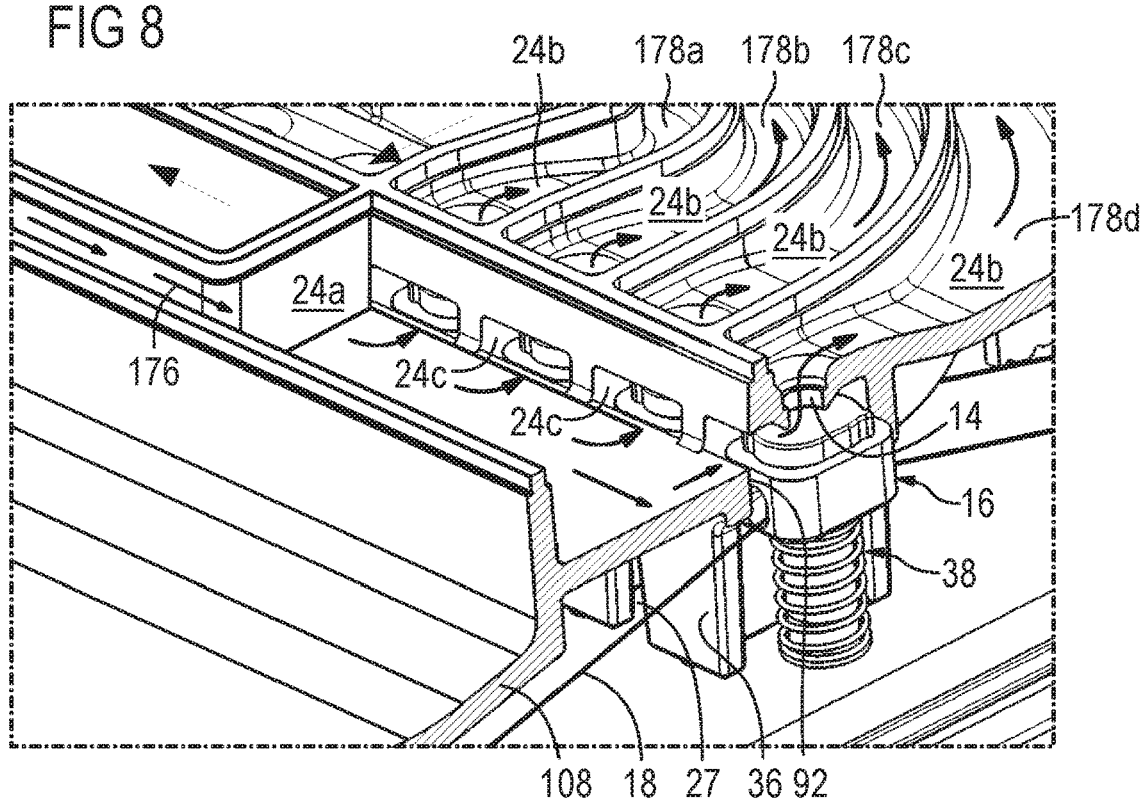
FIG. 8 is a detailed isometric view of the intermediate housing with the actuator from FIG. 7.
Figure 9:
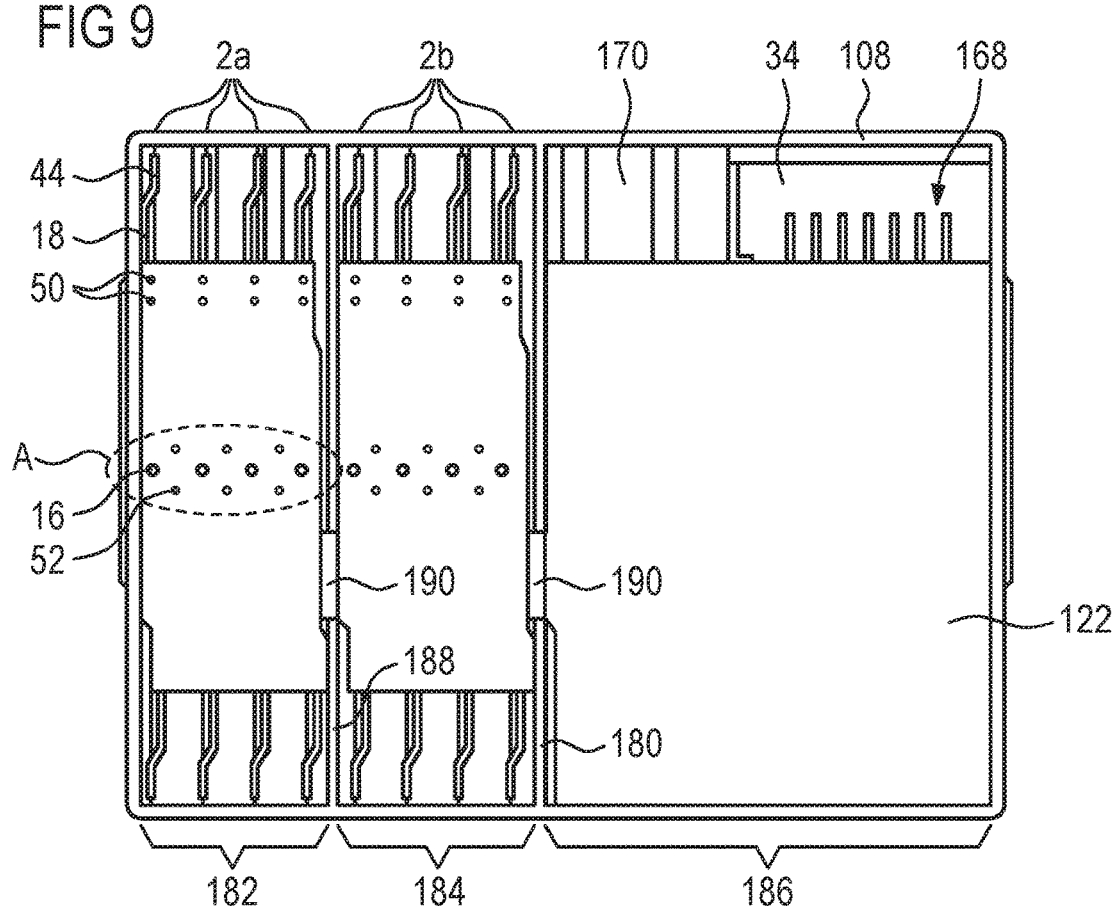
FIG. 9 is a bottom view of the intermediate housing of the valve arrangement according to FIG. 6 with integrated printed circuit board.
Figure 10:
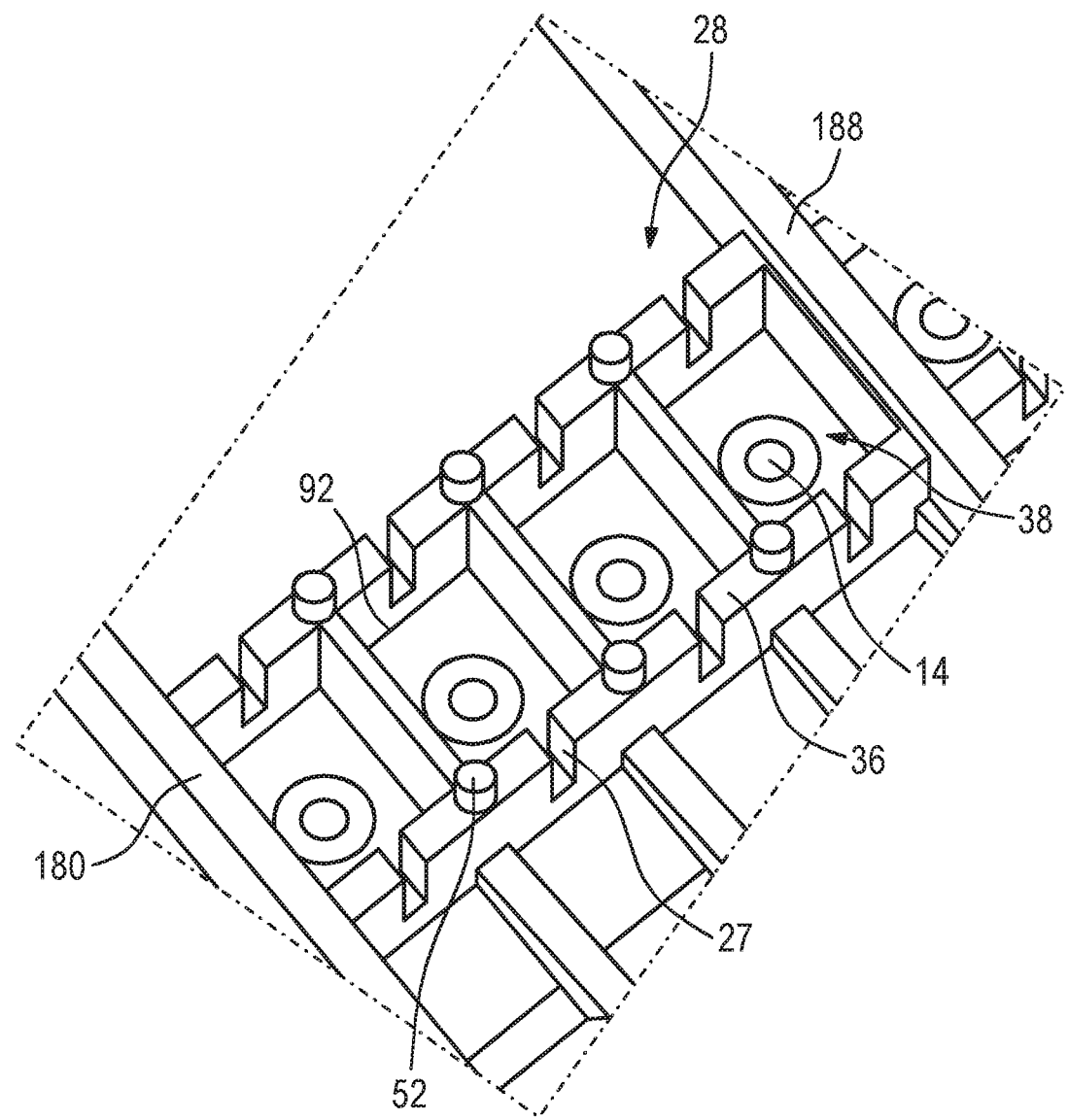
FIG. 10 is a detailed isometric view of an underside of the intermediate housing of the valve arrangement according to FIG. 6 without printed circuit board.

FIG. 7 shows a top view of the intermediate housing 108 of the valve arrangement from FIG. 6, a section of the intermediate housing 108 in FIG. 8, and FIG. 9 shows a view of the intermediate housing 108 from below with mounted printed circuit board 122. FIG. 10 shows the section A of the intermediate housing 108 in a view from below without printed circuit board. Air (indicated by dotted arrows) is supplied to the flow chambers, more precisely to the first areas 24a of the flow chambers of a first part of the valve 2, here four valves 2a, via a joint pressure connection 170, which can be connected to a pneumatic pump through an air channel 176 formed by the intermediate housing 108 and bordered by the intermediate housing 108 on its upper side. Between the pressure connection 170 and an area 182, a non-return valve 172 is arranged inside the air channel 176. The first areas 24a of the valves 2a form the area 182 together, in which the air channel 176 ends, i.e. the final section of the air channel 176. However, it could also be conceivable to separate the first areas 24a in each case by separating walls, so that the first areas 24a form in each case a terminal section of the air channel 176. Air flowing into the first areas 24a is largely held in the first areas 24a when the valve opening 14 is closed. However, a little air is exchanged through the air gaps 92 between the flow chamber 24 or the first areas 24a and the respective actuation chamber 26 of the valve 2 to ensure pressure compensation. In addition, the dimension of the gap allows the desired cooling of the SMA elements 18 to be adjusted or heat from the actuation chamber 26 to be dissipated. If the valve opening 14 is released, air flows from the first area 24a of the flow chamber via the connecting channel 24c through the valve opening 14 into the second area 24b or farther via air channels 178a, b, c, d to consumer connections 130a, b, c, d for (in this case) four media reservoirs or air cushions (see FIG. 8—solid arrows).

A second part of the valves 2 (here four valves 2b) has a joint opening 132 to the atmosphere executed in the housing lid 106 (see FIG. 6) and connected to the atmosphere via the first areas 24a of the flow chambers 24 of the second part of the valves 2b or an area 184 encompassing the first areas 24a of the valves 2b. When a media reservoir is vented, the air inside it flows at first through the respective consumer connection 130a, b, c, d to the air channels 178a, b, c, d or the second areas 24b and then through the opened valve opening 14 of the valves 2b as well as the connecting channel 24c to the area 184 (see FIG. 8—dotted arrows). Air is also exchanged here between the area 184 and the actuator chambers 26 of the valves 2b via the air gaps 92 when the valve opening 14 is open.

The second areas 24b of the flow chambers of a first valve 2a and a second valve 2b are in each case fluidically connected to one another in pairs as well as to one of the four consumer connectors 130a, b, c, d shown here for four media reservoirs or air cushions. In this case, one of the air channels or air chambers 178a, b, c, d is allocated to each media reservoir or air cushion, wherein the separating walls 180, 188 separating the air channels 178a, b, c, d—just like the areas 182, 184 and the areas 184, 186—from one another are, in turn, integrally executed with the intermediate housing 108 or formed by it. In other words, in each case, one first valve 2a and a second valve 2b are allocated to one media reservoir and connected to it, wherein the first valve 2a serves to fill the media reservoir with air and the second valve 2b serves to empty the media reservoir. This combination of filling and venting by air channels 178a, b, c, d executed in the intermediate housing 108 achieves a 3/3-way functionality of the valve arrangement 100. Thus, with regard to the overall airflow, the valve arrangement 100 divided into three areas, one pressure area 182 connected to the pneumatic pump and in which the valves 2a or their first areas 24a are arranged, a venting area 184 connected to the atmosphere via opening 132 and in which the first areas 24a of the valves 2b are arranged, and an electronics area 186 that contains the essential electronic parts. Pressure sensors (not shown) could be provided both in the pressure area 182 and venting area 184 or electronics area 186 so conclusions can be drawn for the respective pressure in the air cushions.

The pressure area 182, the venting area 184 and the electronics area 186 are in each case separated from one another by the separating walls 180, 188 formed by the intermediate housing 108 and pneumatically sealed against one another. To achieve a sealed transition 190 of the printed circuit board 122 between the pressure area 182 and the venting area 184, and between the venting area 184 and the electronics area 186, an adhesive is applied on the transition 190 in the separating wall 180, 188 through an opening in the printed circuit board 122, distributed in the intermediate area between the printed circuit board 122 and separating wall 180, 188 and can, for example, be hardened with UV light.

To attach the printed circuit board 122 to the intermediate housing 108, it has projections 52 formed on a front side of the intermediate walls 36 that form the receiving spaces 38 (FIG. 10) and in the assembled state extend via recesses of the printed circuit board 122 and inextricably fixed in place therein (FIG. 9).

Figure 12:
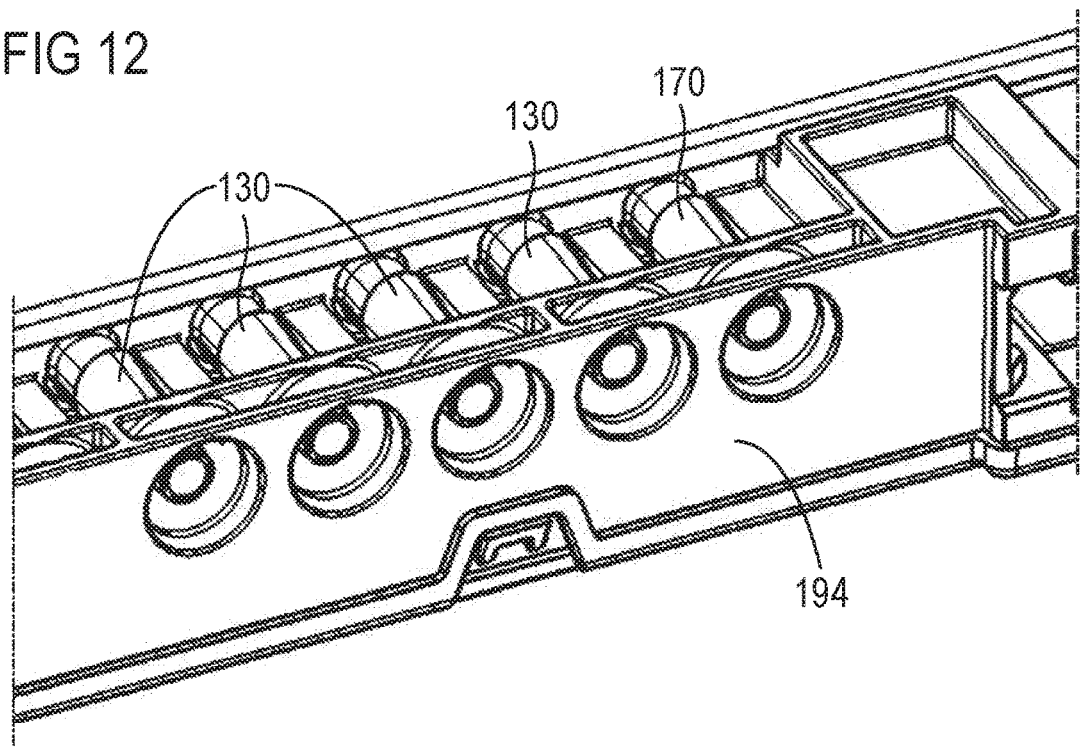
FIG. 12 is a detailed isometric view of an intermediate housing with a support device.
Figure 13A:
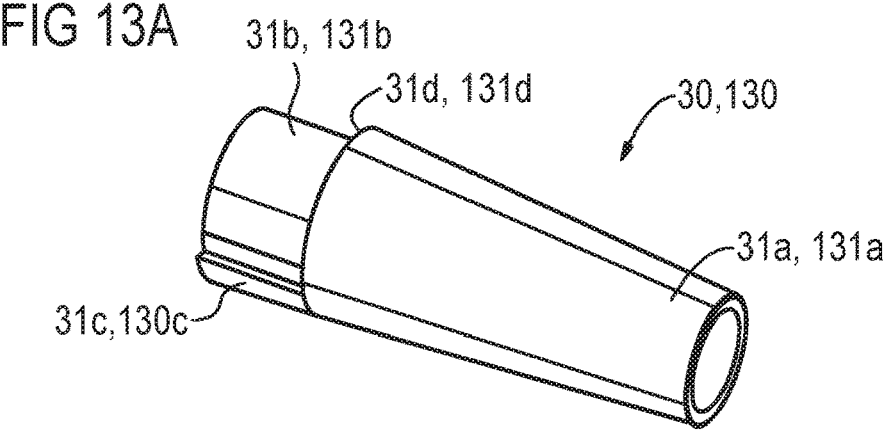
FIGS. 13A-C are respectively isometric, end, and side views of a connection piece.
Figure 13B:
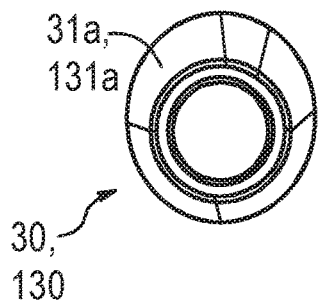
Figure 13C:
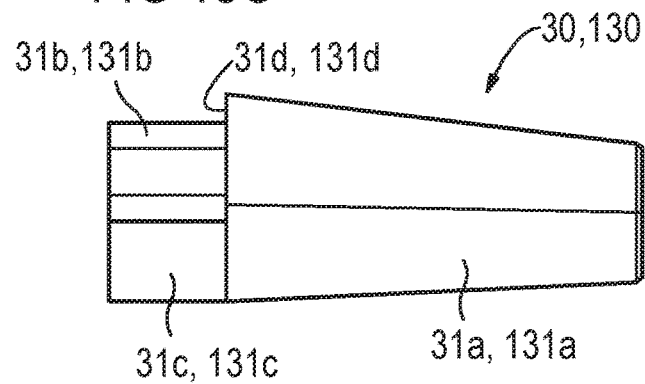

The pneumatic pump and the media reservoirs are connected to the valve arrangement through hoses, which are slipped on the pressure connection 170 or the consumer connections 130a, b, c, d. To protect the pressure connection 170 or the consumer connections 130a, b, c, d (which are here fully arranged inside the intermediate housing 108 and do not protrude from it) from mechanical influences, a support device 194 has been integrated into the intermediate housing 108, through which the hoses can be inserted and connected to the connectors (see also FIG. 12). The support device 194 is exemplarily a metal sheet that partially encompasses the pressure connection 170 and the consumer connections 130a, b, c, d with an opening through which a hose can be inserted for connection to the connections. In a valve arrangement 100 having such a support device 194, the wall thickness of the cylindrically formed connections can, for example, be reduced, which in turn increases the flow of the valve 2. FIGS. 13A to 13C show exemplarily a consumer connection 30, 130, a pressure connection 170 has a corresponding form. The consumer connection 30, 130 has a first terminal section 31a, 131a facing away from the valve chamber 12 and tapering off to a free end. Connected to it, a largely elliptical second terminal section 31b, 131b, 31c, 131c facing towards the valve chamber has been provided. Here, the circumferential section 31c, 131c has a larger outer diameter compared to the circumferential section 31b, 131b, i.e. it is radially widened. In assembled state, the widened circumferential section 31c, 131c is arranged on the underside of the connecting piece 30, 130. As a result of this, a rear grip surface 31d, 131d has been executed between the first terminal section 31a, 131a and the second terminal section 31b, 131b, 31c, 131c to ensure a secure seat of the hose inserted on the connection 30, 130 and secures it against being pulled off.

Figure 11:
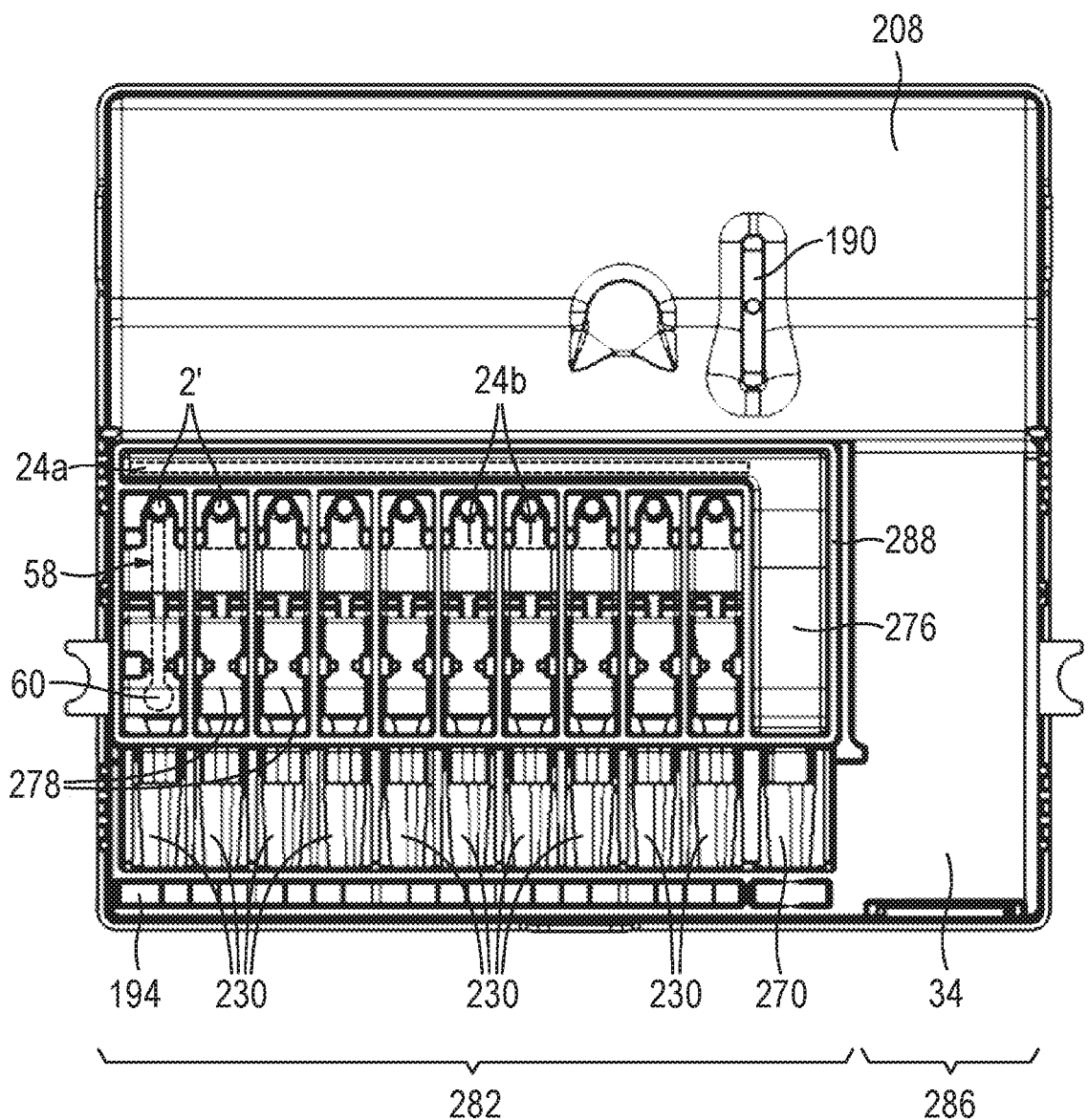
FIG. 11 is a top view of an intermediate housing of a valve arrangement according to a second embodiment.

FIG. 11 shows an intermediate housing 208 according to another embodiment, namely for a valve arrangement having several valves 2' executed according to FIG. 1B (i.e. 3/2-way valves), used for example to perform a massaging function of a vehicle seat, hence for the cyclical filling and venting of several air cushions. Mention is made here that the remaining components of the valve arrangement correspond essentially to those of the previously described valve arrangement 100. By selecting the intermediate housings 108 or 208 and thus the air channels arranged therein, the desired functionality can be therefore achieved, either massage or static adjustment.

The intermediate housing 208 has a common pressure connection 270 through which all valves 2' can be connected to a pneumatic pump, wherein the pressure connection 270 is connected in each case to the first areas 24a of the flow chambers 24 of the valves 2' through an air channel 276 formed inside the intermediate housing 208 or ends in them. For reasons of clarity, the actuator 58 is shown dashed only for one of the valves 2'. An opening to the atmosphere for each valve 2' has been executed in the housing lid that connects the second areas 24b of the flow chambers with the atmosphere (see FIG. 1B). One media reservoir has been allocated to each valve 2' with which the respective valve 2' or its second area 24b is connected via an air channel 278 and consumer connections 230 that can be executed, in turn, according to FIGS. 13A-C.

In such an executed intermediate housing 208, the valve arrangement has a connected pressure area 282, separated from an electronics area 286, in turn, by a separating wall 288. A transition 190 of the printed circuit board between the pressure area 282 and the electronics area 286 is also pneumatically sealed here according to the previous designs.

To fill a media reservoir, air flows through the air channel 276 into the first areas 24a or into the area 282 encompassing the first areas 24a and—as is also the case with the intermediate housing 108—through air gaps 92 into the actuation chamber 26. If the valve opening 14 is opened, air flows out of the first area 24a via the connection channel 24c through the valve opening 14 into the second area 24b and from there, possibly through additional air channels not shown here, through the consumer connections 230 to the respective media reservoir. At the same time, the actuator 58 is moved, so that the opening 32 is closed. To vent the media reservoir, the valve opening 14 is closed by moving the actuator 16 to return position. This, in turn, also moves the actuator 58, thereby releasing the opening 32. As a result of this, owing to the excess pressure prevailing in the media reservoir, the air trapped therein starts flowing out of the valve 2' through the opening 32. Also in this intermediate housing 208, the air channels 276 and the area 282 are formed by the intermediate housing itself as well.

| List of reference characters | |
|---|---|
| 2, 2a, 2b | Valve |
| 4 | Valve housing |
| 6 | Housing lid |
| 8 | Intermediate housing |
| 10 | Housing bottom |
| 12 | Valve chamber |
| 14 | Valve opening |
| 16 | Actuator |
| 16a | First terminal section of the actuator |
| 16b | Second terminal section of the actuator |
| 18 | SMA element |
| 18a | First end of the SMA element |
| 18b | Second end of the SMA element |
| 18c | Middle section of the SMA element |
| 20 | Return element (coil spring) |
| 22 | Printed circuit board |
| 22a | Upper side of the printed circuit board |
| 22b | Bottom side of the printed circuit board |
| 24 | Flow chamber |
| 24a | First area of the flow chamber |
| 24b | Second area of the flow chamber |
| 26 | Actuation chamber |
| 28 | Separating wall |
| 30, 130, 230 | Consumer connection |
| 31a, b, c, d | Sections of the consumer connection |
| 32 | Opening |
| 34 | Receiving space |
| 36 | Intermediate wall |
| 38 | Receiving space |
| 40 | Recess |
| 42 | Sealing element |
| 44 | Crimp connector |
| 46 | Seat of the crimp connector |
| 48 | Section of the crimp connector |
| 50 | Clamping element |
| 52 | Projection |
| 54 | Passage opening |
| 56 | Slit |
| 58 | Actuator |
| 60 | Sealing element |
| 62 | Shift finger |
| 64 | Return element |
| 66 | Turning point |
| 92 | Air gap |
| 100 | Valve arrangement |
| 106 | Housing lid |
| 108, 208 | Intermediate housing |
| 110 | Housing bottom |
| 116 | Actuator |
| 131a, b, c, d | Sections of the consumer connection |
| 168 | Plug connector |
| 170, 270 | Pressure connection |
| 172 | Non-return valve |
| 174 | Cushioning foam |
| 176, 276 | Air channel |
| 178a, b, c, d, 278 | Air channels |
| 180 | Separating wall |
| 182 | Pressure area |
| 184 | Venting area |
| 186 | Electronics area |
| 188, 288 | Separating wall |
| 190 | Transition |
| B | Movement direction of the actuator |
| H | Stroke direction |
| R | Return direction |
| $A_1$ | Lateral projection of the crimp connector |
| $A_2$ | Axial projection of the crimp connector |

The invention claimed is:

1. A valve comprising:
a valve housing including a housing lid, a housing bottom, and an intermediate housing between the housing lid and the housing bottom, the housing lid, the housing bottom, and the intermediate housing collectively defining therein a valve chamber with a valve opening, and wherein inside the valve chamber there are:

at least one actuator that is axially movable between a closing position to close the valve opening and an opening position to open the valve opening;
an SMA element made of a shape memory alloy that activates the actuator in an opening direction toward the opening position;
a return element that moves the actuator in a closing direction toward the closing position; and
a printed circuit board, the SMA element having two ends and a middle section, the SMA element being attached to the actuator at the middle section and being electrically connected at the ends to the printed circuit board for supply of an electrical current;
wherein the intermediate housing forms part of guiding elements that guide the actuator and fastening elements that fix the printed circuit board in place inside the valve, so that the guiding elements and the fastening elements are one of: (a) integrated into the intermediate housing or (b) formed unitarily with the intermediate housing.

2. The valve according to claim 1, wherein the valve chamber includes one flow chamber and one actuation chamber separated at least in part fluidically from one another by a separating wall of the valve opening.

3. The valve according to claim 2, wherein at least one of a connecting channel that connects a first area of the flow chamber and a second area of the flow chamber and the valve opening is closed in the closing position of the actuator and released in the opening position of the actuator.

4. The valve according to claim 1, wherein at least one of a pressure connection that connects the valve to an air supply unit and ends in the valve chamber and a consumer connection that connects the valve to a media reservoir ends in the valve chamber are formed by the intermediate housing, and wherein the housing lid defines at least one opening for fluidically connecting the valve chamber to the atmosphere for releasing air.

5. The valve according to claim 4, wherein the actuator includes a first actuator, and inside the valve chamber is located a second actuator pivotable on the intermediate housing and coupled with the first actuator so that the opening to the atmosphere is released by the second actuator when the first actuator is in the closing position and closed by the second actuator when the first actuator is in the releasing position.

6. The valve according to claim 4, wherein the valve housing 4 has a support device that encompasses, at least partially, at least one of the pressure connection and the consumer connection, and wherein at least one of the pressure connection and the consumer connection has a first terminal section tapering off to a free end and facing away from the valve chamber and a second terminal section facing the valve chamber, the second terminal section being at least in part radially narrowed in a circumferential direction.

7. The valve according to claim 1, wherein the guiding elements guide a first terminal section of the actuator facing the valve opening, the guiding elements including an intermediate wall extending at least partially around and in the direction of movement of the actuator and formed unitarily with the intermediate housing and a receiving space for the actuator.

8. The valve according to claim 7, wherein the fastening elements include at least a deformable projection on the intermediate housing extending through a recess of the printed circuit board and permanently connected to the printed circuit board.

9. The valve according to claim 8, wherein the fastening elements are located on one front side of the intermediate wall facing the printed circuit board, and wherein the front side of the intermediate wall forms a stopping surface for the printed circuit board.

10. The valve according to claim 7, wherein the intermediate wall defines recesses in the direction of movement of the actuator, the SMA element being guided inside the recesses.

11. The valve according to claim 1, wherein the guiding elements guide a second terminal section of the actuator facing away from the valve opening, the guiding elements being integrated into the printed circuit board.

12. The valve according to claim 1, wherein the ends of the SMA element are electrically connected to the printed circuit board via a crimp connector.

13. The valve according to claim 12, wherein the ends of the SMA element are fixed in place perpendicularly to a direction of movement of the actuator laterally over the printed circuit board on a seat of the crimp connector, the seat at least one of: (a) projecting laterally over the printed circuit board and (b) spaced from an upper side of the printed circuit board in a stroke direction of the actuator, and wherein a section of the crimp connector spaced away from the seat is arranged on the upper side of the printed circuit board and electrically connected to the printed circuit board.

14. The valve according to claim 13, wherein a first terminal section of the actuator has a passage opening extending perpendicularly to the direction of movement of the actuator and extending through the first terminal section, and wherein the middle section of the SMA element is guided inside the passage opening.

15. The valve according to claim 14, wherein the first terminal section of the actuator defines a lateral slit that ends in the passage opening.

16. A valve arrangement with several of the valves according to claim 1, wherein the valve housings and printed circuit boards of the valves are executed as one piece.

17. The valve arrangement according to claim 16, wherein at least one first part of the valves has a common pressure connection at least one of ending in the valve chamber and connected to the valve chamber via at least one air channel, and wherein at least one second part of the valves has a common opening for connection to the atmosphere.

18. The valve arrangement according to claim 17, wherein the at least one air channel and the first areas of the flow chambers are formed by the intermediate housing.

19. The valve arrangement according to claim 17, wherein at least one of the valve chambers of the valves are separated from the receiving space for the electronic contacting of the printed circuit board by a first separating wall and the at least one first part of the valves and the at least one second part of the valves are separated by a second separating wall.

20. The valve arrangement according to claim 16, wherein the valves have a common pressure connection, the common pressure connection configured at least one of: (a) ending in the valve chamber and (b) connected to the valve chamber via at least one air channel, and wherein each valve has a separate opening for connection to the atmosphere.

21. The valve according to claim 1, wherein the intermediate housing defines a receiving space to receive components for electrical contact with the printed circuit board.

* * * * *